(12) United States Patent
Young et al.

(10) Patent No.: US 6,873,980 B2
(45) Date of Patent: Mar. 29, 2005

(54) SYSTEM FOR INTERFACING AN APPLICATION PROGRAM WITH DIVERSE DATABASES

(75) Inventors: William J. Young, Golden, CO (US); Tricia M. Roush, Aurora, CO (US); Bruce R. Geerdes, Westminster, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 293 days.

(21) Appl. No.: 09/740,212

(22) Filed: Dec. 15, 2000

(65) Prior Publication Data

US 2002/0111945 A1 Aug. 15, 2002

(51) Int. Cl.[7] ............................................... G06F 17/30
(52) U.S. Cl. .......................... 707/1; 707/104.1; 705/26
(58) Field of Search .............................. 707/3, 102, 9, 707/10, 1, 104.1, 4, 528; 705/26, 27, 28

(56) References Cited

U.S. PATENT DOCUMENTS

| | | | | |
|---|---|---|---|---|
| 5,950,188 A | * | 9/1999 | Wildermuth | 707/3 |
| 6,026,409 A | * | 2/2000 | Blumenthal | 707/104.1 |
| 6,115,705 A | * | 9/2000 | Larson | 707/3 |
| 6,484,149 B1 | * | 11/2002 | Jammes et al. | 705/26 |
| 6,523,022 B1 | * | 2/2003 | Hobbs | 707/3 |
| 6,560,591 B1 | * | 5/2003 | Memmott et al. | 707/1 |

OTHER PUBLICATIONS

Reese, George, Database Programming with JDBC and JAVA, Aug. 2000, pp. 1–317.
Downing, Troy Bryan, Java ™ RMI: Remote Method Invocation, 1998, pp. 147–183.

* cited by examiner

Primary Examiner—Charles L. Rones
Assistant Examiner—Hassan Mahmoudi
(74) Attorney, Agent, or Firm—Kent A. Lembke; William J. Kubida; Hogan & Hartson LLP

(57) ABSTRACT

A system for querying a database. Query strings comprising queries from application program are loaded from a text file into a query lookups table. The application then utilizes a database interface query function to access the queries in the lookups table. The query function uses the query name provided by the application to locate the corresponding query string in the lookups table. The query function then performs parameter substitution on the query string and sends the query to the database. The query results are then retrieved, formatted, and sent to the querying application. The present invention allows an application program to access data stored on databases organized by various database management systems which employ different query formats. Although the databases organize the data differently, the same content may be extracted by the present system. Changes to the database queries take place outside the application code in a simple text file that is loaded by the querying application.

23 Claims, 5 Drawing Sheets

SYSTEM FOR INTERFACING AN APPLICATION PROGRAM WITH DIVERSE DATABASES

BACKGROUND OF THE INVENTION

1. Field of the Invention

The present invention relates generally to database query methods, and more particularly, to a system for interfacing an application program with more than one database instance.

2. Description of Related Art

Queries to a database from an application program have historically been written with a specific database instance (data model) in mind. The application is thus typically tailored to generate database query commands of the form required for the specific database. Since each database model has its own set of data query/access commands, the application program must be re-coded and re-assembled in order to access a database other than the one with which it was originally designed to interface. Therefore, not only is it time consuming and costly to re-program an application to provide access to a different database, the application must also be re-tested after the new database query commands have been retrofitted into the application. The testing procedure is also time consuming, and it may be difficult to ensure that the revised application is as robust as the original application without running the application in its real-world environment, a situation which may entail a certain amount of undesirable risk.

There are a number of reasons why application programs are tailored for a specific type of database. These reasons include performance considerations as well as the fact that such tailoring has simply been the 'normal' way to program a database-related application. Furthermore, since the structure of the database is typically known in advance, it is seemingly 'natural' to structure the database queries in accordance with the structure of the database and known features of a particular database query language. It has heretofore also been assumed that acceptable performance of most applications utilizing database queries could be achieved only by using 'built-in' queries tailored specifically for the database's particular query language. Therefore, when it is required that an application be run with a database other than the one for which the application was originally intended, the application must be re-programmed. Re-programming is time consuming and requires that the modified application program also be re-tested. Re-testing of the application not only requires further time and effort, but also introduces an additional risk of having undetected errors present in the application when it is introduced back into the user environment.

Thus, a mechanism is needed which enables a given application program to run with any type of database and associated query language without incurring the overhead and risk associated with re-programming and re-testing the application for each different database type.

SUMMARY OF THE INVENTION

The present invention overcomes the aforementioned problems of the prior art and achieves an advance in the field by providing a method for interfacing an application program with a number of different databases without necessitating re-programming of the application for each different database. The present system provides a mechanism, transparent to the application program, which handles I/O requests from the application in such a manner as to allow the application to interface with any desired database, without re-programming or otherwise changing the specific format of the application to accommodate the particular query format required by a given database.

In accordance with the present system, query strings comprising queries used by an application program are loaded from a text file into a query lookups table. The application then utilizes a database interface query function to access the queries in the lookups table. The query function uses the query name provided by the application to locate the corresponding query string in the lookups table. The query function then performs parameter substitution on the query string and sends the query to the database. The query results are then retrieved, formatted, and sent to the querying application.

The present system allows an application program to access data stored on databases organized by various database management systems which employ different query formats. Although the databases organize the data differently, the same content may be extracted by the present system. Changes to the database queries take place outside the application code in a simple text file that is loaded by the querying application. Testing of the changes is isolated to ensuring the queries return the expected data.

DETAILED DESCRIPTION OF THE INVENTION

Figure 1:
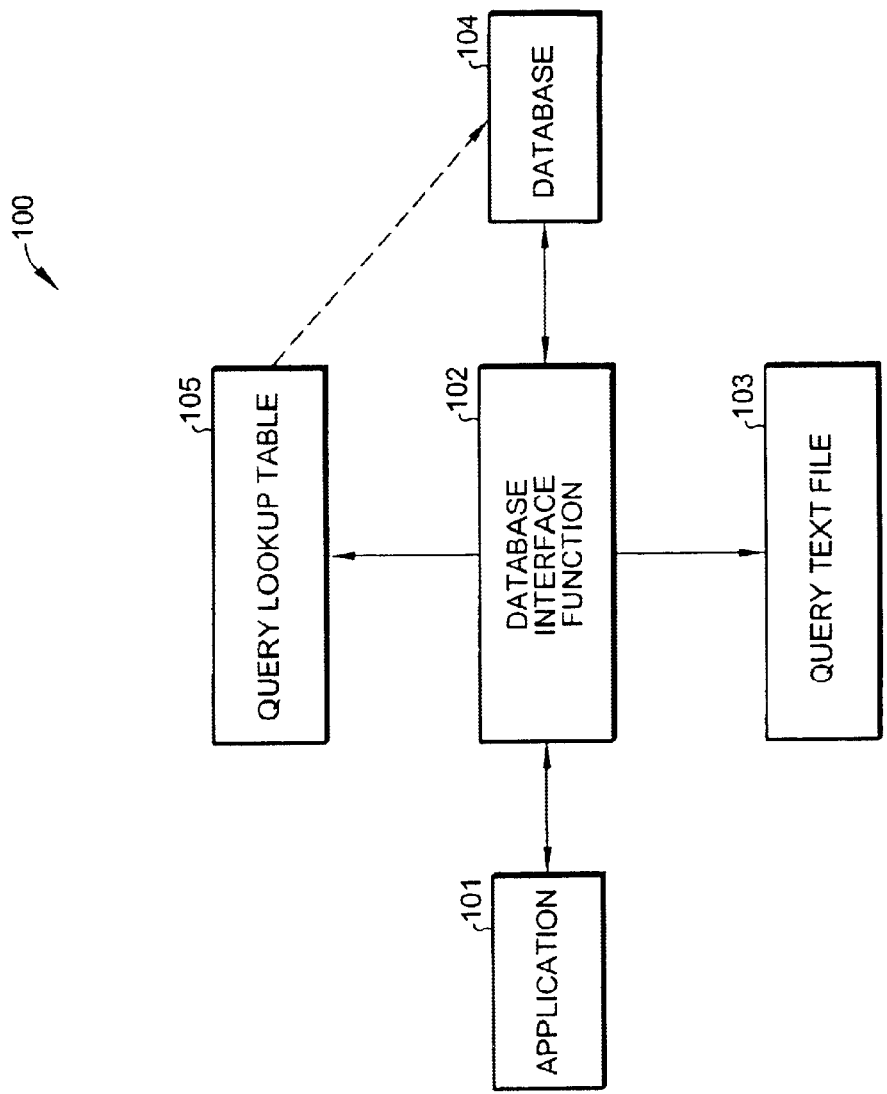
FIG. 1 is a diagram illustrating interrelationships between elements of the present system for managing database queries.

FIG. 1 is a diagram illustrating interrelationships between elements of the present system 100 for managing database queries. As shown in FIG. 1, query strings comprising database queries used by application program 101 are stored in a query text file 103. Queries are read from query text file 103 by database interface query function 102 and loaded into a query lookups table 105. Database interface function 102 uses queries stored in lookups table 105 to access database 104 in response to a database access request by application 101.

Figure 2:
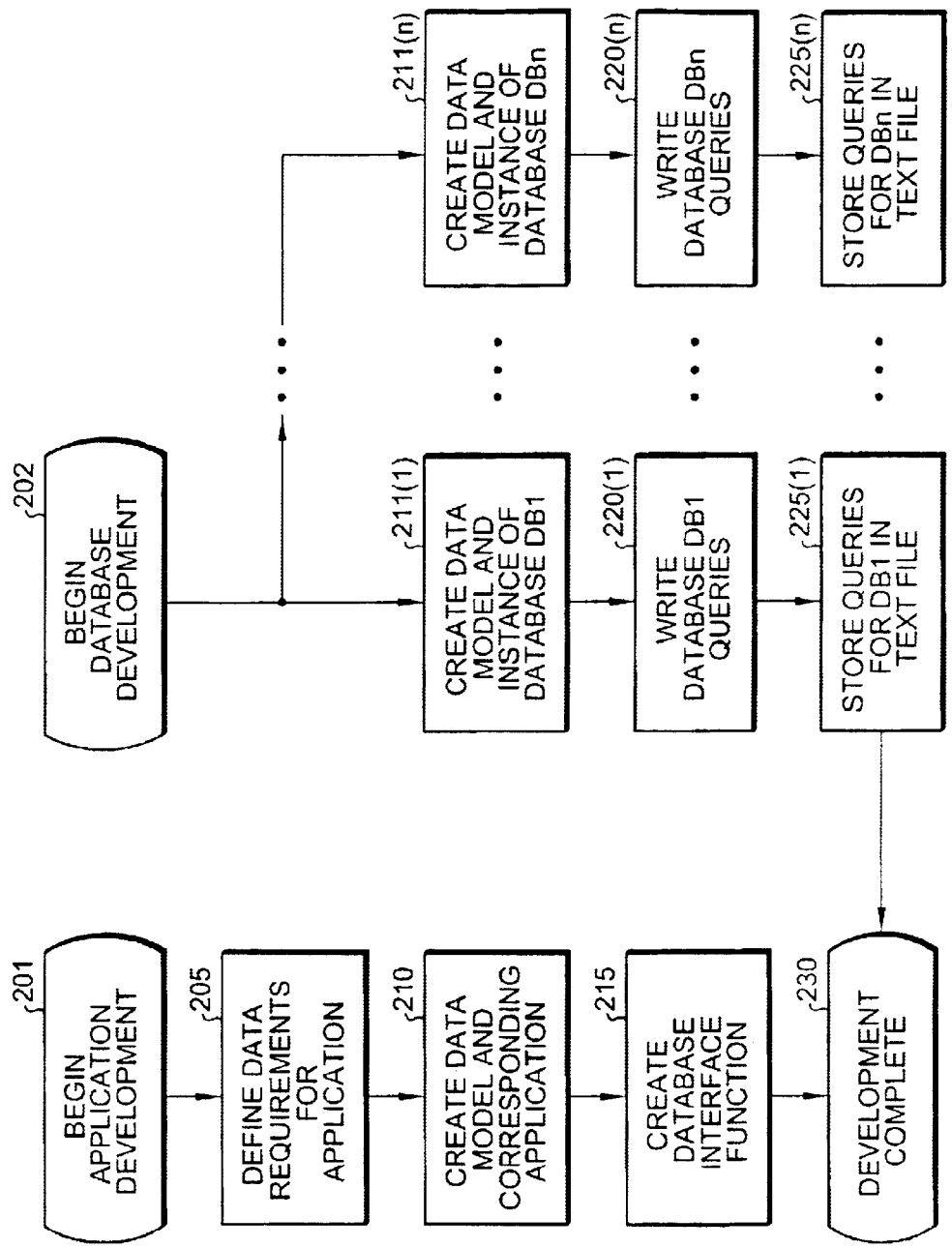
FIG. 2 is a flowchart illustrating preliminary steps which are performed in the development process prior to operation of the present system.

FIG. 2 is a flowchart illustrating steps which are performed in the development process prior to operation of the present system. As shown in FIG. 2, the development process can be split into two separate phases, one phase, beginning at step 201, for development of application 101 which requires database access, and the other phase, beginning at step 202, for development of one or more database instances D1–Dn, each of which is compatible with application 101. Initially, at step 201, the data requirements for application 101 are defined at step 205. This step includes defining the types of database access required by the application, such as, where in the application the calls to the database will be made, and what database access is required (e.g., update, search, etc.). The development process for database D1, or multiple databases (D2–Dn), with which application 101 will interface, may take place in parallel with development of application 101. The database development is shown as starting at step 202, as indicated by the blocks with suffixes (D1) and (Dn), on the right side of FIG. 2, where 'D1' indicates database number 1, and 'Dn' indicates database number n, with any number (n-2) of databases in between.

On the application development (left) side of FIG. 2, at step 210, a data model, corresponding to the data requirements of application 101, is created. Application 101 is then created in accordance therewith. At step 215, a database interface function 102 is created that will accept data from database 101 and perform the appropriate formatting for use by the rest of the application 101. The present system implements both application 101 and database interface function 102 as objects. Steps 205, 210, and 215 need be performed only once, i.e., at the time application 101 is written. On the database development (right) side of FIG. 2, at steps 211(1)-(n), independent of the development of application 101 (i.e., developed asynchronously with respect thereto), a data model is created for each database with which it is desired to interface application 101. A corresponding database instance 104 [DB1–DBn] is then created for each database data model. At steps 220(1)–(n), the database queries are written that will be used for extracting the desired data from each database 104 [DB1–DBn]. Clearly, the queries must be written so that the data returned by each query matches the data expected by the database interface objects. Next, at steps 225(1)–(n), the queries written in step 220 are stored in a query text file 103(1)–-(n). Steps 211, 220 and 225 are thus performed for each different database DB1–DBn with which application 101 will interface; for example, a custom-designed database for a first group of users, and perhaps an existing database for a second user group. The use of multiple query text files 103 by the present system 100 is further described below with respect to FIG. 4.

Finally, at step 230, development of application 101 and database DB1 (or databases DB1–DBn) is complete, and operation of system 100 proceeds as described below with respect to FIG. 3.

Figure 3:
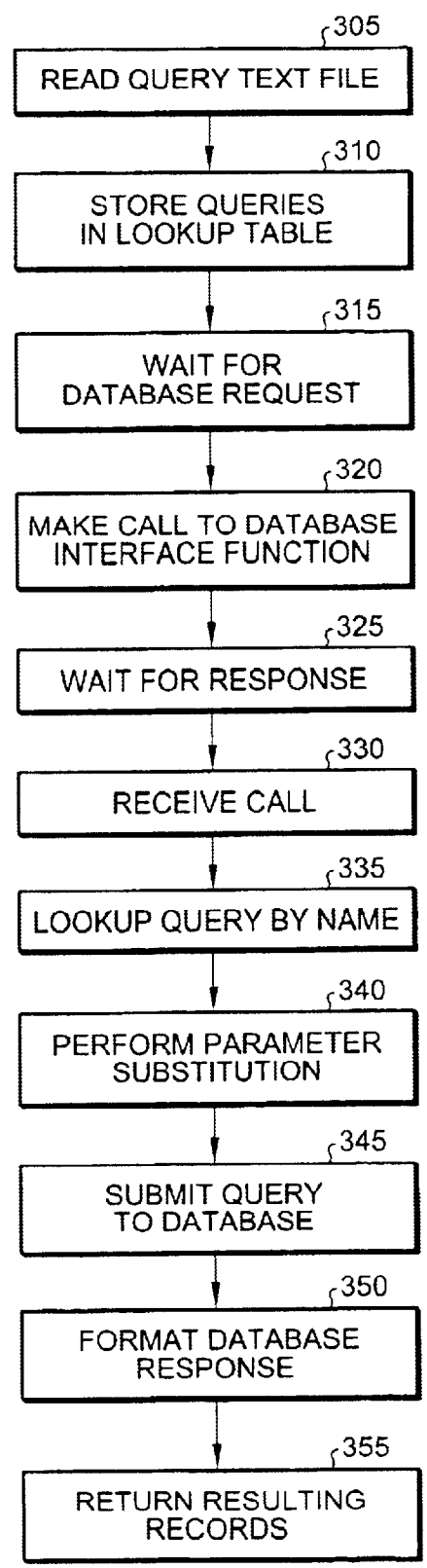
FIG. 3 is a flowchart illustrating operation of the present system.

FIG. 3 is a flowchart illustrating operation of the present system in an exemplary embodiment. As shown in FIG. 3, prior to execution of the first database access request by application 101, at step 305, database interface function 102 reads query text file 103. Next, at step 310, query text file 103 is loaded into a query lookups table 105. Queries are stored as strings, by query name, in the lookups table. Steps 305 and 310 may be performed upon initial execution of database interface function 102, or, alternatively, on demand while application 101 is running. In the present embodiment, text file 103 is loaded into query lookups table 105 as a hash table, but could be loaded, alternatively, in any format compatible with the operation of database interface function 102. Database interface function 102 then waits, at step 315, for a database access request from application 101.

At step 320, application 101 makes a database access request, invoking database interface function 102, which controls access to the query strings. The query name and the arguments required by the specific query are provided by the application, accompanying the call to database interface function 102. These arguments are typically either search criteria or data used to update the database content. Application 101 then waits, at step 325, for a response back from database interface function 102.

At step 330, database interface function 102 receives the database access call from application 101. Database interface function 102 then performs a query lookups by name in query lookups table 105 at step 335, and at step 340 performs textual substitution of the parameters (provided by the application) into the positions identified in the query string. At step 345, the query is submitted to database 104. Database interface function 102 passes the query string to database 104 using a mechanism such as JDBC or other API for communicating queries. Next, at step 350, a response from the database is received, which is formatted by database interface function 102 into either records or objects in accordance with the type of format expected by application 101. Finally, at step 355, the resulting records or objects are returned to application 101.

Figure 4:
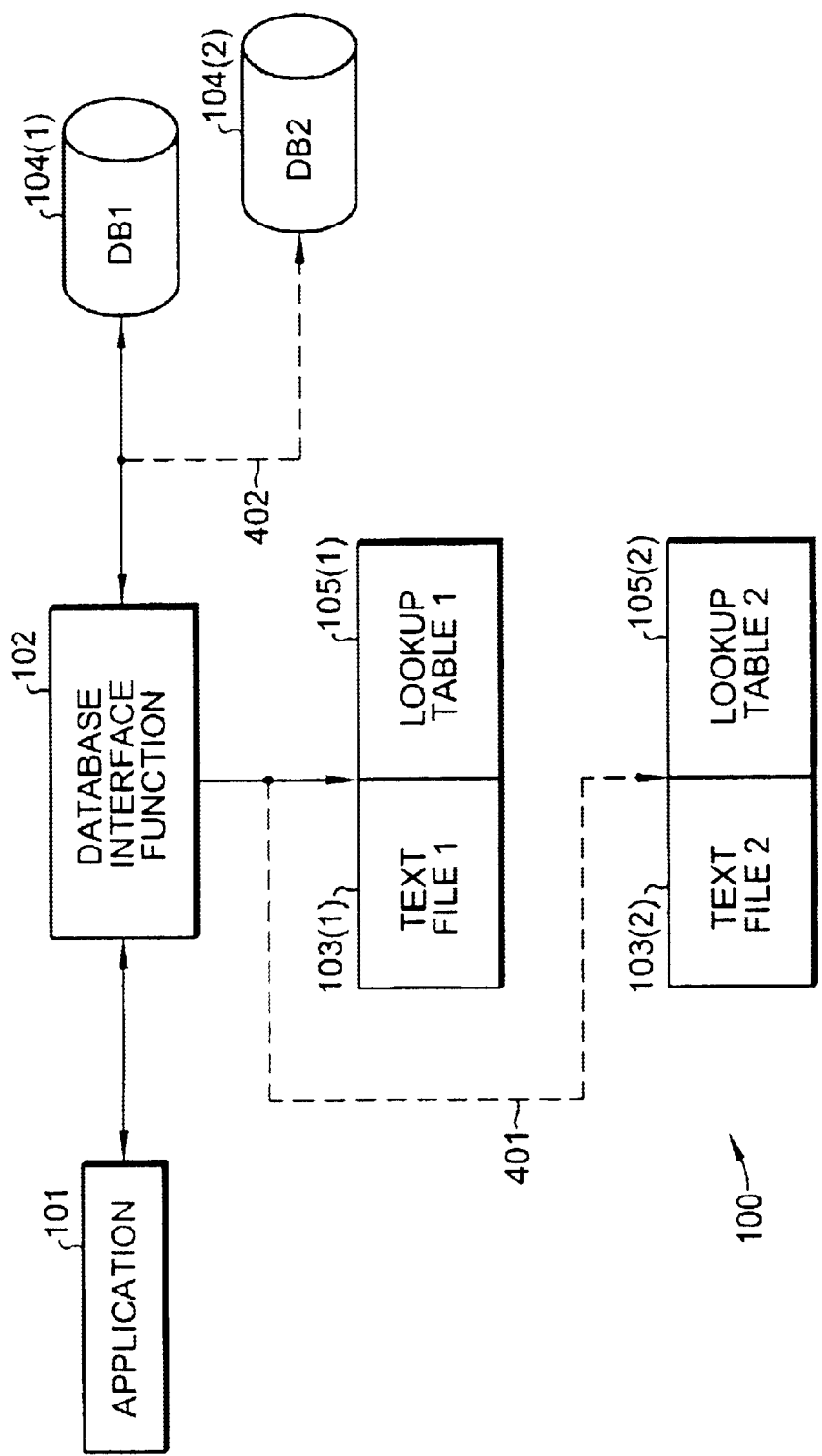
FIG. 4 is a diagram illustrating elements of the present system which facilitate accessing of two different databases.

FIG. 4 is a diagram illustrating the manner in which the present invention provides for an interface between a given application and dissimilar databases. As shown in FIG. 4, queries used by application program 101 to access database DB1 [ref. no. 104(1)] are stored in query text file 103(1). Query text file 103(1) is then read by database interface function 102, and the queries are stored (after being hashed) in query lookups table 105(1). Next, when application program 101 issues a request for access to database DB1, database interface function 102 locates, by name, the corresponding query string stored in query lookups table 1 [ref. no. 105(1)] which is specifically formatted in accordance with the syntax of the DBMS (for example, Oracle DBMS) used to implement DB1. Database Interface Function 102 then performs parameter substitution on the query string and sends the query to database DB1. Database interface function 102 then retrieves the query results, formats the results, and sends the formatted results to application 101. The operation described thus far with respect to FIG. 4 is exactly as described above with respect to FIG. 3.

FIG. 4 further shows the procedure employed by the present system when it is desired to have application program 101 access data stored on a database DB2 (ref. no. 104(2)) managed by a DBMS (e.g., Sybase) that is different than the DBMS used with DB1. In this case (as shown in FIG. 2 at step 220), each of the queries stored in text file 103 is modified for syntax compliance with DB2. Next (at step 225 in FIG. 2), the queries are stored in text file 103(2). Database Interface Function 102 next reads query text file 103(2), then hashes and stores the queries therein in query lookups table 105(2), as indicated by arrow 401. In the present example, when application 101 issues a database access request, database interface function 102 locates the corresponding query string stored in query lookups table 105(2), which has effectively replaced query lookups table 105(1). Database Interface Function 102 then performs parameter substitution on the query string and sends the query to database DB2, as indicated by arrow 402. Finally, database interface function 102 retrieves the query results from DB2, formats the results, and sends the formatted results to application 101.

Therefore, it can be seen that the underlying queries stored in any given text file 103 may be changed to accommodate access between application 101 and any desired database (e.g., DB1 or DB2) or any new table/view definitions without changing any of the underlying compiled code in application 101. An alternative embodiment of the present system may be coded with a switch to allow application program 101 to access either DB1 or DB2. In this situation, query lookups tables 105(1) and 105(2) are advantageously pre-populated with hashed queries from text files 103(1) and 103(2) prior to operation of application 101.

The method of the present invention is further explained with reference to two hypothetical databases. For the purpose of the present example, these two databases are database DB1 [ref. no. 104(1)] and database DB2 [ref. no. 104(2)], as shown in FIG. 4. A simple collection of data about an individual is employed in the present example to demonstrate the mechanism of the present invention for handling database queries. The information stored in each of the two databases (DB1 and DB2) shown below includes a person's name and some contact information for the person. The first data model assumes only a single set of contact information for an individual, while the second data model allows multiple sets of contact information.

For the first database, assume that the following information is stored in a single table called Person:

Person [DB1]
id (PersonID)
surname (SurName)
given name (GivenName)
title (Title)
phone number (PhoneNumber)
email address (EmailAddress)

A query to access this information could be formatted as follows:

SELECT PersonID, Title, GivenName, SurName, PhoneNumber, EmailAddress
FROM Person WHERE PersonID={0};

The {0} in the above query is a replaceable parameter which allows the application to request information on a specific person. Multiple parameters may be used in the general case. The above query returns the requested person's primary contact information.

The second hypothetical database of the present example, DB2, contains the same information as the first database above. However, this second database is organized in a slightly different fashion. This second database has two tables, Person and ContactInfo:

Person [DB2]
id (PersonID)
title (Title)
first name (FirstName)
last name (LastName)
middle name (MiddleName)
ContactInfo [DB2]
id (PersonID)
type (Type)
phone number (PhoneNumber)
email address (EmailAddress)
street address, first line (Street1)
street address, second line (Street2)
city (City)
state (State)
zip (ZipCode)

The ContactInfo table allows multiple records for one person, with the different records distinguished by type. Assume, in this example, that the type of interest is '1', which corresponds to the person's primary contact information. A query to extract the same information from the second database DB2 could be formulated as:

SELECT a.PersonID, a.Title, a.FirstName, a.LastName, b.PhoneNumber, b.EmailAddress
FROM Person a, ContactInfo b
WHERE a.PersonID=b.PersonID
AND a.PersonID={0} AND b.Type=1;

For the present example, assume that there is a need to select contact information from the database. In this case, the discriminator (name of the query) is Person.SelectContactInfo. The query definitions for the two databases would then have the following formats:

DB1
Person.SelectContactInfo=SELECT PersonID, Title, GivenName, SurName, PhoneNumber, EmailAddress FROM Person WHERE PersonID={0}

DB2
Person. SelectContactInfo=SELECT a.PersonID, a.Title, a.FirstName, a.LastName, b.PhoneNumber, b.EmailAddress FROM Person a, ContactInfo b WHERE a.PersonID=b.PersonID AND a.PersonID={0} AND b.Type=1

Note that for both cases above, the information returned (in the same order) is:

an identifier (PersonID in both databases), Title, First name (FirstName vs GivenName), Last name (LastName vs SurName), Phone number, and Email Address. Note also that the argument passed ({0}) references the identifier in both cases.

The two databases described above organize the data differently, but the same content may be extracted. The change to the query takes place outside the application program code in a simple text file that is loaded by the application. As long as the same data can be retrieved from the two databases, the present system provides a mechanism for its retrieval from either database without necessitating any modifications to the underlying application.

Figure 5:
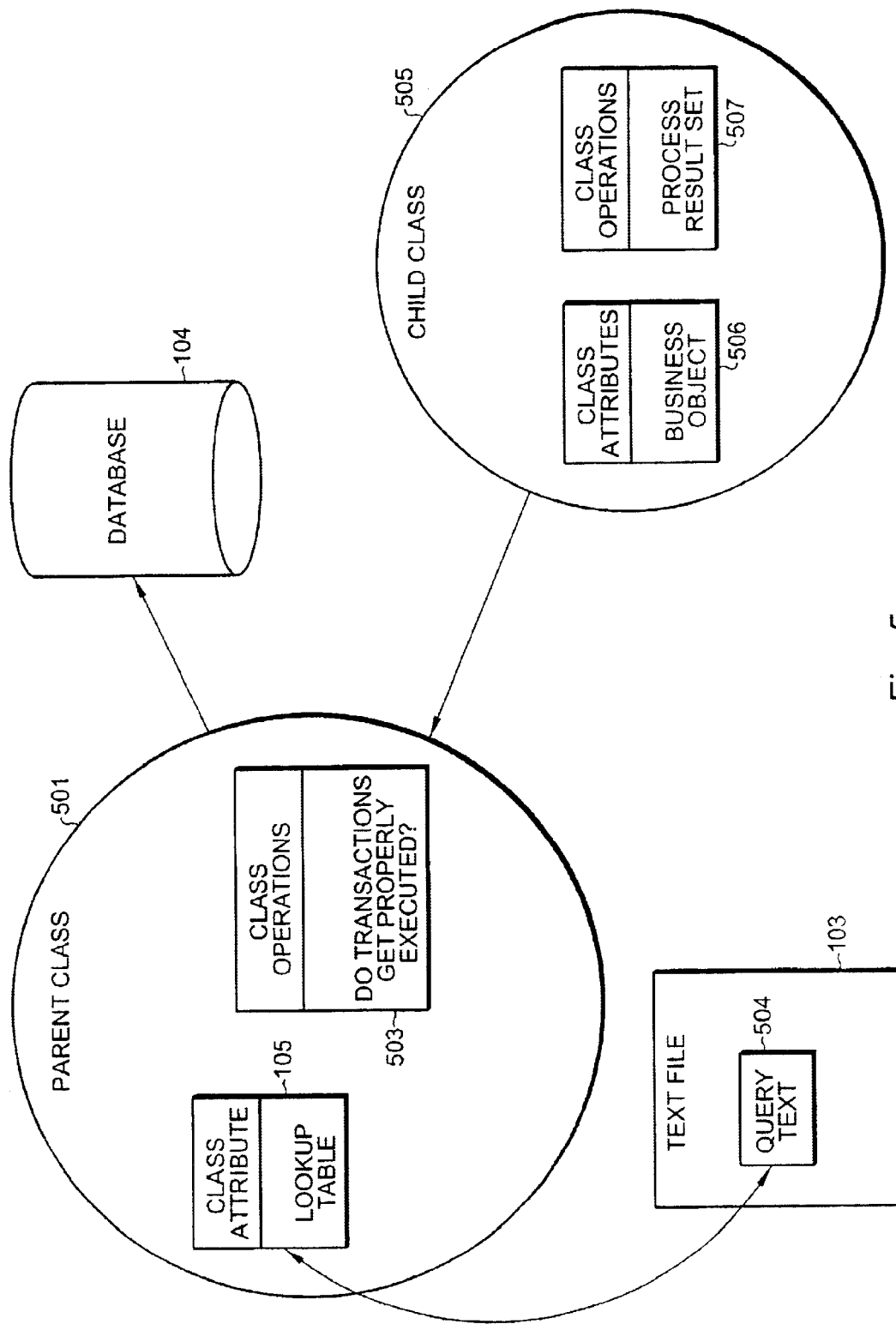
FIG. 5 is a diagram illustrating operation of the present system in an object-oriented environment.

FIG. 5 is a diagram illustrating operation of the present system 100 in an object-oriented environment. In the current embodiment (an object-oriented programming environment), a parent class (501) includes the query function (shown as database interface function in FIG. 1) and a child class (subclassed object) 505 formats the results of a query, as explained in detail below. Business objects (506) provide the structure to carry the database request discriminator and parameters to the database interface function, and to carry the return data from the database interface function back to the application.

The parent class is written to handle the common application logic described for database interface function 102. The parts that are common to all queries are:

(1) loading queries into the lookups table (steps 305 and 310 in FIG. 3);
(2) performing query lookups (step 335); and
(3) performing parameter substitution (step 340)

The static data required (in query lookups table 105) can be a class attribute, available to all subclasses without requiring reloading for each query. Subclasses only override the portions of the processing required, which is, most frequently, only the portion that formats the response from database 104.

Although a procedural implementation could perform the loading of the file into a common data area, the handling of the specific requests would require more complicated coding using conditionals or other decision making mechanisms to direct the query submission and response to the proper procedures.

The method of the present system 100 is described below with reference to FIG. 5, in conjunction with Tables 1 and 2 (below). Initially, text file 103 containing query text strings 504 is loaded into query lookups table 105 (sqlProperties), which is an attribute of parent class 501. The actual lookups in the hashtable (or other lookups table) and format method is performed by getMessageFormat: [Table 1, lines 40–44], which uses getProperty [Table 1, lines 47–51] to actually retrieve the query string, the name of which has an exemplary format of the form:

<class name>.<discriminator>

The operation of the present system 100 is explained below with continuing reference to FIG. 5, and also with reference to Tables 1 and 2, using the following query 504(1) for retrieving personal contact information as an example:

Query 504(1)

Person.SelectContactInfo=SELECT PersonID, Title, GivenName, SurName, PhoneNumber, EmailAddress FROM Person WHERE PersonID={0}

Next, in an exemplary embodiment, an object is created (BusinessObject 506) which is a carrier object that contains the two required data items (discriminator and list of arguments to the query). This object becomes a member (businessObject) of the appropriate subclass of DBObject. Once the database request has been issued and the results processed, a new instance (returnObj) of business object 506 is created to hold the result data. BusinessObject 506 is both a carrier of data to the database 104, as well as a carrier of data returning from the database.

In the present example, a DBObject subclass is created that properly formats the resulting data sets from such a query (i.e., the data values of id, title, first name, last name, phone number, and email address). A carrier object (e.g., businessObject 506) is also created that another layer of the application sends to the database 104. The businessObject 506 looks (from an abstract viewpoint) like a record containing a pair of items, a discriminator (e.g., Person.SelectContactInfo), and a list of arguments (e.g., {id}). Specifically, the businessObject 506 containing the discriminator Person.SelectContactInfo is created, and an argument list of one item, the person's user id {"jsbach"}. This name/value (discriminator/argument list) 'pair' is sent to the DBPerson subclass 505 [Table 2] of DBObject by calling the doTransaction method (shown as one of parent class operations 503) of the DBObject [Table 1, lines 13–19].

Next, doTransaction calls getDBMessageFormat [Table 1, lines 40–44], which retrieves the query by lookups in the table (105) of name/value pairs, resulting in retrieval of the query 504(1), shown above. The query parameters are replaced with the arguments (args) provided by the call fmt.format [Table 1, line 18]. DBMessageFormat is a utility class that scans the input String for arguments of the form {0}, {1}, etc, takes arguments from the passed in array of arguments, and substitutes them by position. For example, a reference of {0} will be replaced by the 0th argument of the argument array—args[0]. DBMessageFormat is an extension of the standard Java™ class MessageFormat. The result of the use of DBMessageFormat is substitution of the arguments into the query string, providing the specific query that will be sent to the database:

Person.SelectContactInfo=SELECT PersonID, Title, GivenName, SurName, PhoneNumber, EmailAddress FROM Person WHERE PersonID='jsbach'

Note the one replacement location indicated by {0} in the query as stored in the lookups tables is replaced by the actual argument, "jsbach".

Now that this query is fully specified for the database of interest, doTransaction calls the execute method [Table 1, line 18], which makes the actual connection to the database and sends the query to the database. The two parts actions resulting in the call to the database are createStatement and stmt.execute [Table 1, lines 26–27]. The result may be a set of rows, retrieved into resultSet [Table 1, line 29], or a count of rows updated, stored in an attribute of returnObj [Table 1, lines 32–34].

When a resultSet is returned from the database, processResultSet 507 [Table 1, lines 53–57; overridden in Table 2] extracts the data. At this point, iteration is performed over the rows returned to resultSet to make a new result record. The record is filled with field values from the row, and the result record is stored in the returnObj [Table 1, line 29].

Next, the data is stored in a simple object which is essentially a data record. To allow for more than one row of data to be returned, the returnObj (which is an instance of businessObject 506) holds the resulting record or records in an array. Application logic can then extract whatever elements are needed from this array one at a time. The resulting data record from the example query contains the following information:

jsbach

Kapellmeister

Johann

Bach 123-456-7890 jsbach@brandenburg.org

Finally, the query results are returned (via returnObj) to the caller.

Actual Java™ code is listed below in Table 1 for the DBObject parent class that, in accordance with an exemplary embodiment of the present method, performs a translation between a database access request in a given application and the database of interest.

TABLE 1

DBObject parent class

```
1    /* DBObject.java */
2    public abstract class DBObject {
3
4        /** Hashtable containing queries. */
5        private static Properties sqlProperties;
6
7        /** Business object we wrap. */
8        protected BusinessObject businessObject;
9
10       /** JDBC database connection. */
11       protected Connection connection;
12
```

TABLE 1-continued

DBObject parent class

```
13          /** Do transaction with database. */
14          public BusinessObject doTransaction() throws SQLException {
15              DBMessageFormat fmt =
16                  getMessageFormat(businessObject.getDiscriminator());
17
18              return execute(fmt.format(businessObject.getArgs()));
19          } // doTransaction
20
21
22          /** Execute a SQL Statement. */
23          protected BusinessObject execute(String sqlString) throws SQLException {
24              BusinessObject returnObj = null;
25
26              Statement stmt = connection.createStatement();
27              if (stmt.execute(sqlString)) {
28                  // was select; do result set
29                  returnObj = processResultSet(stmt.getResultSet());
30              } else {
31                  // was insert/update/delete; do row count
32                  returnObj = (BusinessObject)businessObject.getClass().
33                      newInstance();
34                  returnObj.setResultCount(stmt.getUpdateCount());
35              }
36
37              return returnObj;
38          } // execute
39
40          /** Get DBMessageFormt statement. */
41          protected DBMessageFormat getMessageFormat(String stmtName) {
42              String stmt = getProperty(getClass(), stmtName);
43              return new DBMessageFormat(stmt);
44          } // getMessageFormat
45
46
47          /** Get property related to specific class. */
48          private String getProperty(Class objClass, String propName) {
49              return sqlProperties.getProperty(objClass.getName() +
50  "." + propName);
51          } // getProperty(Class, String)
52
53          /** Fill in the BusinessObject with the data from the result set. */
54          protected BusinessObject processResultSet(ResultSet rs)
55              throws SQLException {
56              return null;
57          } // processResultSet
58
59      } // DBObject
60  End of Table 1
```

Table 2 contains exemplary Java™ code that represents a sample child class 505 for a Person entity. It shows the key elements and what is normally overridden in the child classes. The parent class code that is overridden is the code that retrieves the data from resultSet. The child classes usually override only processResultSet, although they can override any methods that are not designated as final. Queries for different databases are written to ensure that the data returns in the same order.

TABLE 2

DBPerson child class

```
1       / * @(#)DBPerson.java
2       *
3       * DBObject wrapper around BusinessObject "Person".
4       */
5       public class DBPerson extends DBObject {
6       /**
7           * Parses result set, creates a business object.
8           * @param rs Result Set
9           * @return business object
10          * */
11          public BusinessObject processResultSet(ResultSet rs) {
12              // get data out of ResultSet
13              if(rs != null) {
```

TABLE 2-continued

DBPerson child class

```
14            obj = new Person();
15            while (rs.next()) {
16                String id = rs.getString(1);
17                String lastName = rs.getString(2);
18                String firstName = rs.getString(3);
19                String middleName = rs.getString(4);
20                int role = rs.getInt(5);
21                PersonData d =
22                    new PersonData(id, "", firstName, middleName,
23                                    lastName, role);
24                obj.addDataObject(d);
25            }
26            return obj;
27        } // processResultSet
28    } // DBPerson
29 End of Table 2
```

While exemplary embodiments of the present invention have been shown in the drawings and described above, it will be apparent to one skilled in the art that various embodiments of the present invention are possible. For example, the specific Java™ code listed in Tables 1 and 2, as well as other specific instances of code set forth in this document, should not be construed so as to limit the embodiments described herein. Furthermore, although the disclosed embodiments are described with respect to an object-oriented programming environment, the system disclosed herein may, alternatively, be implemented using procedural programming techniques. Modification may be made to these and other specific elements of the invention without departing from its spirit and scope as expressed in the following claims.

What is claimed is:

1. A system for querying a database in response to data access requests issued by an application program, the system comprising:
    a text file containing queries corresponding to said data access requests, wherein the queries are formatted in accordance with the syntax required by said database;
    a database interface function;
    a query lookup table, containing said queries, generated by operation of said database interface function on said text file;
    wherein, in response to one of said data access requests issued to the database, the database interface function selects the query lookup table from among other query lookup tables containing queries formatted for other databases, locates the query in the selected lookup table corresponding to the issued data access request, sends the query to the database, and retrieves results of the query.

2. The system of claim 1, wherein said database interface function also formats the results of the query.

3. The system of claim 2, wherein said database interface function also returns the results of the query after the results have been formatted.

4. The system of claim 1, wherein the queries in said query lookup table are located by name in response to one of said data access requests.

5. The system of claim 4, wherein the query name indicates a type of data requested and a type of operation to be performed on the database.

6. The system of claim 1, wherein each of the data access requests provided by the application comprises a query name and an argument array.

7. The system of claim 1, wherein the queries in said text file are SQL strings.

8. A method for querying a database in response to data access requests issued by an application program, the method comprising the steps of:
    storing queries, corresponding to said data access requests, in a text file wherein the queries are formatted in accordance with the syntax required by said database;
    reading said text file to generate a query lookups table containing said queries;
    submitting, to the database, in response to one of said data access requests, one of said queries from said query lookups table corresponding to said one of said data access requests;
    retrieving the results of the query;
    formatting the results of the query; and
    returning the results of the query to the application program after the results have been formatted;
    wherein each of the data access requests provided by the application comprises a query name and an argument array.

9. The method of claim 8, wherein the queries in said query lookup table are located by name in response to one of said data access requests.

10. The method of claim 8, wherein the queries in said text file are SQL strings.

11. A system for interfacing an application program with more than one type of database in response to data access requests issued by an application program, the system comprising:
    a first text file containing queries corresponding to said data access requests, wherein the queries are formatted in accordance with said first database;
    a database interface function;
    a first query lookup table, containing said queries, generated by operation of said database interface function on said first text file;
    a second database;
    a second text file containing queries, formatted in accordance with said second database, corresponding to said data access requests; and
    a second query lookup table generated by operation of said database interface function on said text file;
    wherein, in response to one of said data access requests issued to one of said databases, the database interface function selects the query lookup table containing the queries formatted in accordance with the database, locates the query in the selected lookup table corresponding to the issued data access request, sends the query to the database, and retrieves results of the query.

12. The system of claim 11, wherein said database interface function also formats the results of the query.

13. The system of claim 12, wherein said database interface function also returns the results of the query after the results have been formatted.

14. The system of claim 11, wherein the queries in said query lookup table are located by name in response to one of said data access requests.

15. The system of claim 11, wherein each of the data access requests provided by the application comprises a query name and an argument string.

16. A method for querying a database in response to data access requests issued by an application program, the method comprising the steps of:

writing database queries to access the database;

storing said database queries in a text file;

reading said queries in said text file;

hashing said queries to generate a query lookup table containing said queries in hashed form;

receiving, from the application program, one of said data access requests including at least one parameter associated therewith;

selecting the query lookup table containing the queries formatted in accordance with the database from among other query lockup tables containing queries formatted for other databases;

locating, in the query lookup table, a selected one of the queries corresponding to said one of said data access requests received from the application program;

substituting said at least one parameter into corresponding positions in the selected one of the queries;

submitting, to the database, in response to one of said data access requests, said selected one of the queries; and retrieving the results of the query.

17. The method of claim 16, wherein the queries in said query lookup table are located by name in response to one of said data access requests.

18. The method of claim 16, wherein each of the data access requests provided by the application comprises a query name and an argument string.

19. A method for querying a database in response to data access requests issued by an application program, the method comprising the steps of:

creating a database interface function to handle said data access requests;

writing database queries to access the database;

executing said database interface function to perform the steps of:

storing the database queries as query strings in a text file;

reading the query strings in said text file;

hashing said query strings to generate a query lookup table containing said queries in hashed form;

receiving, from the application program, one of said data access requests including at least one parameter associated therewith;

selecting the query lookup table containing the queries formatted in accordance with the database from among other query lookup tables containing queries formatted for other databases;

locating, in the query lookup table, a selected one of the queries corresponding to said one of said data access requests received from the application program;

substituting said at least one parameter into corresponding positions in the selected one of the queries;

submitting, to the database, in response to one of said data access requests, said selected one of the queries; and retrieving the results of the query.

20. The method of claim 19, performed in an object-oriented programming environment wherein the database interface function comprises:

a parent class that handles application logic common to all queries; and a child class that formats the results of the query.

21. The method of claim 20, wherein static data in said query lookup table comprises a class attribute available to all subclasses of said parent class without requiring reloading of said query lookup for each of said data access requests.

22. The method of claim 21, wherein the queries in said query lookup table are located by name in response to one of said data access requests.

23. The method of claim 19, wherein each of the data access requests provided by the application comprises a query name and an argument string.

* * * * *

UNITED STATES PATENT AND TRADEMARK OFFICE
CERTIFICATE OF CORRECTION

PATENT NO. : 6,873,980 B2
DATED : March 29, 2005
INVENTOR(S) : William J. Young, Tricia M. Roush and Bruce R. Geerdes It is certified that error appears in the above-identified patent and that said Letters Patent is hereby corrected as shown below:

Title page,
Item [57], ABSTRACT,
Lines 3, 5 and 7, "lookups" should be -- lookup --

Column 12,
Line 33, "lookups" should be -- lookup --

Signed and Sealed this

Twenty-sixth Day of July, 2005

JON W. DUDAS
*Director of the United States Patent and Trademark Office*